(12) United States Patent
Shamasundar (10) Patent No.: US 11,908,330 B2
(45) Date of Patent: Feb. 20, 2024

(54) SYSTEMS AND METHODS FOR ANALYZING AIR TRAFFIC CONTROL MESSAGES AND GENERATING ASSOCIATED FLIGHT PERFORMANCE PARAMETERS

(71) Applicant: HONEYWELL INTERNATIONAL INC., Charlotte, NC (US)

(72) Inventor: Raghu Shamasundar, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 170 days.

(21) Appl. No.: 17/647,228

(22) Filed: Jan. 6, 2022

(65) Prior Publication Data
US 2023/0091597 A1 Mar. 23, 2023

(30) Foreign Application Priority Data
Sep. 16, 2021 (IN) .............................. 202111041876

(51) Int. Cl.
*G08G 5/00* (2006.01)
*G10L 15/26* (2006.01)
*G06F 3/14* (2006.01)

(52) U.S. Cl.
CPC ............ *G08G 5/0021* (2013.01); *G06F 3/14* (2013.01); *G08G 5/0039* (2013.01); *G10L 15/26* (2013.01)

(58) Field of Classification Search
CPC .................................................. G08G 5/0021
See application file for complete search history.

(56) References Cited

U.S. PATENT DOCUMENTS

| | | | | |
|---|---|---|---|---|
| 6,356,209 | B1* | 3/2002 | Mitchell | ................. G10L 15/26 704/E15.045 |
| 9,666,178 | B2* | 5/2017 | Loubiere | ................. G10L 13/00 |
| 10,847,145 | B2* | 11/2020 | Lafon | ..................... G10L 15/00 |
| 2007/0219678 | A1 | 9/2007 | Coulmeau | |
| 2007/0241936 | A1 | 10/2007 | Arthur et al. | |
| 2010/0030401 | A1* | 2/2010 | Rogers | ................. G08G 5/0039 701/3 |
| 2011/0282522 | A1 | 11/2011 | Prus et al. | |
| 2013/0093612 | A1* | 4/2013 | Pschierer | ................. G01S 7/22 342/36 |
| 2013/0346081 | A1 | 12/2013 | Loubiere et al. | |

(Continued)

FOREIGN PATENT DOCUMENTS

EP         2267683 A3    5/2011

*Primary Examiner* — Travis R Hunnings
(74) *Attorney, Agent, or Firm* — Lorenz & Kopf, LLP (57) ABSTRACT

Systems and methods for providing a visual user interface on a display associated with an aircraft. The systems and methods transcribe, using a voice to text application, an ATC broadcast message; analyze the transcribed ATC broadcast message for flight plan information; send a request to an avionics service system to determine at least one flight performance parameter based on the flight plan information; receive the determined at least one flight performance parameter from the avionics service system in response to the request; and render a visual User Interface (UI) including the transcribed ATC broadcast message and a flight performance parameter advisory based on the at least one flight performance parameter, wherein the flight performance parameter advisory is tagged to the transcribed ATC broadcast message in the visual UI.

18 Claims, 5 Drawing Sheets

(56) References Cited

U.S. PATENT DOCUMENTS

| | | | |
|---|---|---|---|
| 2014/0336915 A1 | 11/2014 | Pakki et al. | |
| 2015/0081292 A1* | 3/2015 | Populus | G08G 5/0095 |
| | | | 704/235 |
| 2015/0162001 A1* | 6/2015 | Kar | G08G 5/0013 |
| | | | 704/235 |
| 2017/0124734 A1* | 5/2017 | Gowda | G08G 5/0013 |
| 2021/0233411 A1* | 7/2021 | Saptharishi | G08G 5/0021 |
| 2022/0406194 A1* | 12/2022 | Saptharishi | G08G 5/065 |
| 2023/0074014 A1* | 3/2023 | Shamasundar | G08G 5/0091 |
| 2023/0088863 A1* | 3/2023 | Nama | G08G 5/0021 |
| | | | 340/971 |
| 2023/0091597 A1* | 3/2023 | Shamasundar | G08G 5/0013 |
| | | | 340/963 |
| 2023/0215278 A1* | 7/2023 | Kanagarajan | G06F 3/0481 |
| | | | 340/963 |

* cited by examiner

SYSTEMS AND METHODS FOR ANALYZING AIR TRAFFIC CONTROL MESSAGES AND GENERATING ASSOCIATED FLIGHT PERFORMANCE PARAMETERS

CROSS REFERENCE TO RELATED APPLICATION

This application claims priority to India Provisional Patent Application No. 202111041876, filed Sep. 16, 2021, the entire content of which is incorporated by reference herein.

TECHNICAL FIELD

The subject matter described herein relates to the automated transcription of air traffic control messages and processing and display thereof.

BACKGROUND

Air traffic control (ATC) systems may utilize voice communications to transmit various messages between air traffic controllers and pilots. The messages that are transmitted between air traffic controllers and pilots include, among other things, air traffic control clearances, various advisories, and aviation weather service, which help ensure coordination of aircraft movement and appropriate aircraft separation. Broadcast messages from/to ATC can be transcribed and displayed on a pilot window of an Electronic Flight Bag (application). To do so, a voice to text transcription application transcribes the broadcast messages. In particular, the transcription application provides direct translation of conversation messages between crew and a ground ATC member. Some of the messages between the ATC and the flight crew will require a modification of a current aircraft state or Active flight plan, which can be implemented by the pilot. The communications between ATC and a member of the flight crew may require a modification of the aircraft state, but an impact of the communications, if followed, on various flight performance parameters may not be readily discernable to the flight crew.

It is desirable to provide methods and systems that provide intelligent support for the flight crew to make decisions based on broadcast ATC messages. It would further be desirable to provide information to help the crew to quickly, and appropriately, act in response to ATC messages and further increase cockpit situational awareness. Furthermore, other desirable features and characteristics of the present invention will become apparent from the subsequent detailed description and the appended claims, taken in conjunction with the accompanying drawings and the foregoing technical field and background.

BRIEF SUMMARY

In one aspect, a method is provided for providing a visual user interface on a display associated with an aircraft. The method includes receiving, via a receiving system of the aircraft, an Air Traffic Control (ATC) broadcast message; transcribing, using a voice to text application, the ATC broadcast message; analyzing, via at least one processor, the transcribed ATC broadcast message for flight plan information; sending a request, via the at least one processor, to an avionics service system to determine at least one flight performance parameter based on the flight plan information; receiving, via the at least one processor, the determined at least one flight performance parameter from the avionics service system in response to the request; and rendering, via the at least one processor, a visual User Interface (UI) including the transcribed ATC broadcast message and a flight performance parameter advisory based on the at least one flight performance parameter, wherein the flight performance parameter advisory is tagged to the transcribed ATC broadcast message in the visual UI.

In embodiments, the at least one flight performance parameter includes at least one of fuel remaining, time of arrival, and distance to destination.

In embodiments, sending the request includes embodying the flight plan information in an Application Programming Interface (API) request.

In embodiments, the method comprises receiving, via the receiving system of the aircraft, ATC broadcast messages; sorting, via the at least one processor, the ATC broadcast messages into ownship ATC broadcast messages and other aircraft ATC broadcast messages; and rendering, via the at least one processor, the visual UI to include the ownship ATC broadcast messages and other aircraft ATC broadcast messages in a visually differentiated way.

In an embodiment, the method comprises performing the following steps for each of the ownship ATC broadcast messages: analyzing, via the at least one processor, a respective ownship transcribed ATC broadcast message for flight plan information; sending, via the at least one processor, a respective request to an avionics service system to determine at least one flight performance parameter based on the flight plan information; receiving, via the at least one processor, the determined at least one flight performance parameter from the avionics service system in response to the respective request; and rendering, via the at least one processor, the visual User Interface (UI) including the respective ownship transcribed ATC broadcast message and a respective flight performance parameter advisory based on the at least one flight performance parameter from the avionics service system in response to the respective request, wherein the flight performance parameter advisory is tagged to the respective ownship transcribed ATC broadcast message in the visual UI; so that the visual UI includes a plurality of ownship transcribed ATC broadcast messages including at least one flight performance parameter tagged to respective ownship transcribed ATC broadcast messages.

In embodiments, the visual UI is a pilot ATC transcription message window.

In embodiments, the flight plan information includes an Active flight plan modification.

In embodiments, the method comprises rendering, via at least one processor, a second visual UI on a second display associated with the aircraft, the second visual UI depicting the at least one flight performance parameter for a current flight plan that has not yet been modified by the flight plan modification.

In embodiments, the avionics service system is a Flight Management System (FMS) of the aircraft.

In embodiments, the avionics service system is a cloud service.

In embodiments, the avionics service system builds a flight trajectory using the flight plan information and derives the at least one flight performance parameter from the flight trajectory.

In another aspect, a system is provided for providing a visual user interface on a display associated with an aircraft. The system comprises a receiving system of the aircraft configured to receive an Air Traffic Control (ATC) broadcast message; a display device associated with the aircraft; and at least one processor in operable communication with the receiving system and the display device. The at least one processor is configured to execute program instructions. The program instructions are configured to cause the at least one processor to: transcribe, using a voice to text application, the ATC broadcast message; analyze the transcribed ATC broadcast message for flight plan information; send a request, via the at least one processor, to an avionics service system to determine at least one flight performance parameter based on the flight plan information; receive the determined at least one flight performance parameter from the avionics service system in response to the request; and render a visual User Interface (UI) including the transcribed ATC broadcast message and a flight performance parameter advisory based on the at least one flight performance parameter, wherein the flight performance parameter advisory is tagged to the transcribed ATC broadcast message in the visual UI.

In embodiments, the at least one flight performance parameter includes at least one of fuel remaining, time of arrival, and distance to destination.

In embodiments, sending the request includes embodying the flight plan information in an Application Programming Interface (API) request.

In embodiments, the program instructions are configured to cause the at least one processor to: receive, via the receiving system of the aircraft, ATC broadcast messages; sort the ATC broadcast messages into ownship ATC broadcast messages and other aircraft ATC broadcast messages; and render the visual UI to include the ownship ATC broadcast messages and other aircraft ATC broadcast messages in a visually differentiated way. In an embodiment, the program instructions are configured to cause the at least one processor to perform the following steps for each of the ownship ATC broadcast messages: analyze a respective ownship transcribed ATC broadcast message for flight plan information; send a respective request to an avionics service system to determine at least one flight performance parameter based on the flight plan information; receive the determined at least one flight performance parameter from the avionics service system in response to the respective request; and render the visual User Interface (UI) including the respective ownship transcribed ATC broadcast message and a respective flight performance parameter advisory based on the at least one flight performance parameter from the avionics service system in response to the respective request, wherein the flight performance parameter advisory is tagged to the respective ownship transcribed ATC broadcast message in the visual UI; so that the visual UI includes a plurality of ownship transcribed ATC broadcast messages including at least one flight performance parameter tagged to respective ownship transcribed ATC broadcast messages.

In embodiments, the visual UI is a pilot ATC transcription message window.

In embodiments, the flight plan information includes a flight plan modification.

In embodiments, the program instructions are configured to cause the at least one processor to: render a second visual UI on a second display associated with the aircraft, the second visual UI depicting the at least one flight performance parameter for a current flight plan that has not yet been modified by the flight plan modification.

In embodiments, the avionics service system is a Flight Management System (FMS) of the aircraft or a cloud service.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Systems and methods described herein provide transcription and analysis of broadcast Air Traffic Control (ATC) communications. The systems and methods include an analyzer which is capable of interpreting text messages provided by a voice to text transcription application. The analyzer analyzes an impact of the content of the text messages on an active flight route and provides visual advisories tagged to displayed transcription messages to support flight crew in understanding impact on flight performance parameters by any flight plan changes proposed in the ATC messages.

The systems and methods described herein provide an algorithmic process to transcribe ATC messages and to identify any flight plan modification events. Based on the flight plan modification event derived from the ATC messages, a request is built to an external system to identify the impact of this message on current aircraft state and trajectory. The resulting aircraft performance parameters obtained in response to the request are rendered as a tag against the corresponding transcribed ATC text message. These tags support the flight crew to understand aircraft state with respect to any ATC required command.

Accordingly, methods and systems are provided that filter flight plan (or other aircraft state) modification events in transcribed ATC messages and provides active tags based on the modification event, thereby enhancing flight crew situation awareness. The systems and methods build a request embodying the flight plan modification event. The request is a request for impact analysis on the flight plan modification. An advisory tag is pinned against the ATC transcript text. The advisory tag can be in terms of fuel impact (change or absolute), time of arrival (change or absolute), distance (change or absolute), etc. The presently disclosed systems and methods increase the knowledge of flight crew by supplementing ATC transcription messages with relevant flight performance parameter impact tags.

Figure 1:
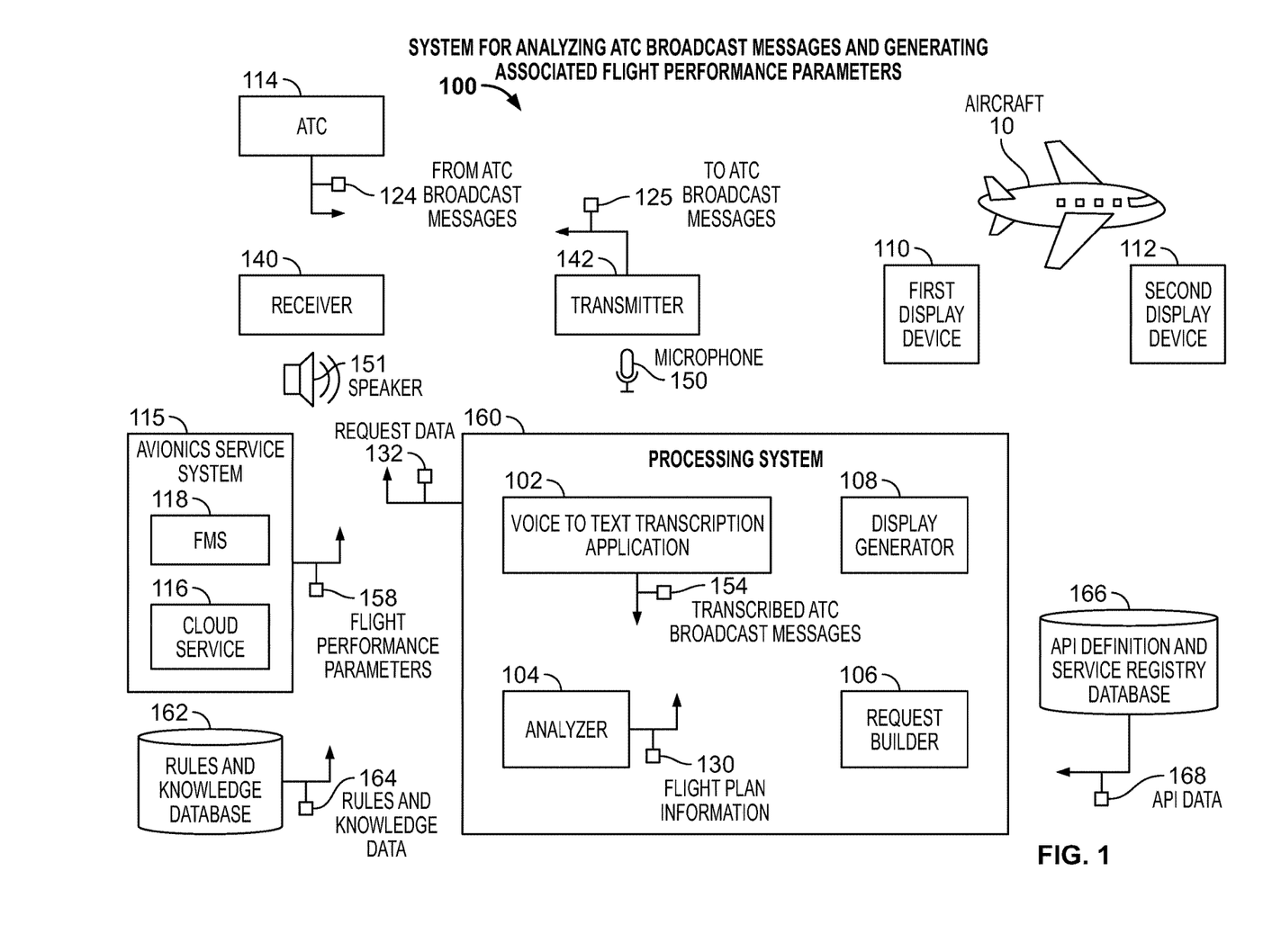
FIG. 1 is a block diagram of transcription system, in accordance with an exemplary embodiment.

FIG. 1 depicts an exemplary embodiment of a system 100 for analyzing ATC broadcast messages and generating associated flight performance parameters. The system 100 is associated with an aircraft 10. The illustrated system 100 includes a processing system 160 configured to execute a voice to text transcription application 102 coupled to an analyzer 104, a request builder 106 and a display generator 108. The voice to text transcription application 102 receives ATC broadcast messages 124, 125 sent between ATC 114 and a member of the flight crew. The system 100 further includes a first display device 110 for rendering a pilot ATC transcription window 206 (see FIGS. 2 and 3) with transcribed ATC broadcast messages 154 and performance parameter advisories that are tagged to, and built based upon, a respective transcribed ATC broadcast message 154. The advisories are built by the request builder 106 based on information extracted from transcribed ATC broadcast messages 154 that are relevant to the ownship aircraft 10. The system 100 further includes an avionics service system 115 that provides one or more flight performance parameters 158 in response to a request for flight performance parameters 158 generated by the request builder 106.

The system 100 is implemented by a processing system 506 as described in further detail below with respect to FIG. 5. The processing system 506 executes programming instructions to analyze transcribed ATC broadcast messages 154 and to build performance parameter tags associated with the transcribed ATC broadcast messages 154, which are displayed together in a pilot ATC transcription window 206 (see FIG. 2). It should be appreciated that FIG. 1 is a simplified representation of the system 100 associated with an aircraft 10 for purposes of explanation and is not intended to limit the subject matter in any way. In this regard, it will be appreciated that, in practice, the system 100 onboard the aircraft 10 may include any number of different onboard systems configured to support operation of the aircraft 10, and the subject matter described herein is not limited to any particular type or number of onboard systems.

The ATC 114 service is a service provided for the purpose of: preventing collisions between aircraft and on the maneuvering area between aircraft and obstructions; and expediting and maintaining an orderly flow of air traffic. Before take-off, the aircraft 10 submits a flight plan to ATC 114. The path of the aircraft 10 may have to be changed from the original flight plan, e.g. to move around bad weather or avoid a congested sector. The pilot may request a change to the flight plan by submitting such a request to the ATC 114. The changes may include changes in flight parameter like heading, speed and/or altitude.

The system 100 of FIG. 1 includes a receiver 140 and a transmitter 142. The receiver 140 receives FROM ATC broadcast messages 125 over a voice based radio channel. The transmitter 142 broadcasts TO ATC broadcast messages 124 over the voice based radio channel by speaking into a microphone 150, which may be part of a headset. The received FROM ATC broadcast messages 125 may be heard by a member of the flight crew through a speaker 151, which may be part of the headset. The ATC broadcast messages 124, 125 (which include both received and transmitted ATC broadcast messages 124, 125 by/from the aircraft 10) can be passed to the voice to text transcription application 102 for conversion from a voice format to a text format. The voice to text transcription application 102 can use any suitable technique for performing conversion from voice to text. The voice to text transcription application 102 may use artificial intelligence (e.g. a recurrent neural network) that transcribes analog or digital aviation audio into text in near-real time. The artificial intelligence application is trained with an aviation specific dataset allowing the voice to text transcription application 102 to perform better than general natural language processing applications, which can provide inaccurate transcriptions due to cadence, noise, and vocabulary of the aviation industry.

The voice to text transcription application 102 outputs transcribed ATC broadcast messages 154 that are provided to the display generator 108 for display on the first display device 110. In embodiments, the receiver 140 receives FROM ATC broadcast messages 124 that are relevant to the ownship aircraft 10 and also other aircraft. The processing system 160 is configured to sort messages directed to the ownship aircraft 10 from those directed to other aircraft so that the display generator 108 can visually differentiate transcribed ATC broadcast messages 154 that are relevant to the ownship aircraft 10 from those relevant to other aircraft.

The processing system 160 can perform this sorting processing by comparing an identifier of the ownship aircraft 10 with an identifier that is used by ATC 114 (and transcribed by the voice to text transcription application 102) with respect to each transcribed ATC broadcast message 154.

In embodiments, the analyzer 104 receives pre-sorted transcribed ATC broadcast messages 154 so that it analyzes transcribed ATC broadcast messages 154 directed to the ownship aircraft 10 and not those directed to other aircraft. In other embodiments, the analyzer 104 performs the sorting step. The analyzer 104 extracts flight plan information 130 from the transcribed ATC broadcast messages 154 directed to the ownship aircraft 10. The analyzer 104 may be configured to identify flight trajectory related information and may particularly be configured to identify flight plan modification events included in the transcribed ATC broadcast messages 154. The analyzer 104 has access to a rules and knowledge database 162 that stores rules to be followed and knowledge required by the analyzer 104 in extracting flight plan information 130. The rules may include grammar rules and the knowledge may include a lexicon of aviation words such as commands and location names (e.g. way point identifiers, etc.). Techniques for extraction of the flight plan information 130 may include named entity recognition. The analyzer 104 may utilize a machine learning algorithm to extract the flight plan information 130. The analyzer 104 may be trained to identify relevant words using rules and knowledge data 164 from the rules and knowledge database 162. The analyzer 104 may be particularly configured to identify commands, locations (e.g. location identifiers) and values associated with the commands and locations (such as an altitude value, speed value, time value, etc.).

The analyzer 104 provides extracted flight plan information 130 to the request builder 106. The request builder 106 embodies at least part of the flight plan information 130 into request data 132 of a suitable format for use by the avionics service system 115. The request data 132 may be embody an Application Programming Interface (API) request to the avionics service system 115. A standard that describes how to build an interface with the avionics service system 115, the services available and the format of request for each type of service is defined by API data 168 retrieved from an API definition and service registry database 166. The request data 132 includes a definition of the service requested and relevant parts of the flight plan information 130 relating to that service request including values of any associated parameters (e.g. altitude, speed, time location, etc.) and a proposed change to a current flight plan (if any). The request data 132 can be configured to ask for any of the available services of the avionics service system 115 that would be of interest to a member of the flight crew. In embodiments, the service request in the request data 132 relates to an impact of a flight plan modification included in the flight plan information 130 on flight performance parameters 158 (such as time impact, fuel impact, distance impact, etc.). The requested flight performance parameters 158 can include one or more of speed, altitude, Estimated Time of Arrival, fuel remaining, time to destination and any other flight performance parameter 158. In some embodiments, all such flight performance parameters 158 may be requested and they can be selectively rendered by the display generator 108 based on user or system preferences or user selections to switch between various flight performance parameters 158.

The avionics service system 115 can include a Flight Management System (FMS) 118, which is an on-board multi-purpose navigation, performance, and aircraft operations computer. Alternatively, the avionics service system can include a cloud service. The FMS 118, the cloud service 116 or another provider may execute a trajectory prediction function that describes the predicted path the ownship aircraft 10 will follow through the airspace. This trajectory can be described mathematically by a time-ordered set of aircraft state vectors. The computation can performed based on input data consisting of the current state and the future intent of the aircraft. The trajectory prediction function uses models for aircraft performance, meteorological conditions, and airspace adaptation data. The trajectory prediction function can also handle "what if" scenarios whereby the impact on flight performance parameters 158 as a result of proposed or forthcoming flight plan modifications defined in the request data 132 can be computed and output.

The display generator 108 receives the flight performance parameters 158 and the transcribed ATC broadcast messages 154 and generates/renders transcribed ATC messages and tags flight performance parameters 158 to the transcribed ATC messages to support the flight crew in understanding an impact on flight performance parameters as a result of any flight plan modification proposed in any given transcribed ATC messages. The transcribed ATC messages 154 and the flight performance parameters 158 are tagged or pinned to one another so that their association can be understood. The rendered display is output on the first display device 110. The first display device 110 may be any cockpit display device or may be an Electronic Flight Bag (EFB) display device such as a tablet display device. The display generator 108 may also generate a variety of other displays such as a display for a second display device 112. The other displays output through the second display device 112 can include a vertical situational view, a lateral view and/or a primary flight display. The other display may display flight performance parameters for a current flight plan that is, loaded to and actively being tracked by, the FMS 118. As such, a member of the flight crew can compare same flight performance parameters for the current flight plan on the second display device 112 and for any modified flight plan included in the transcribed ATC messages 154 on the first display device 110.

Figure 2:
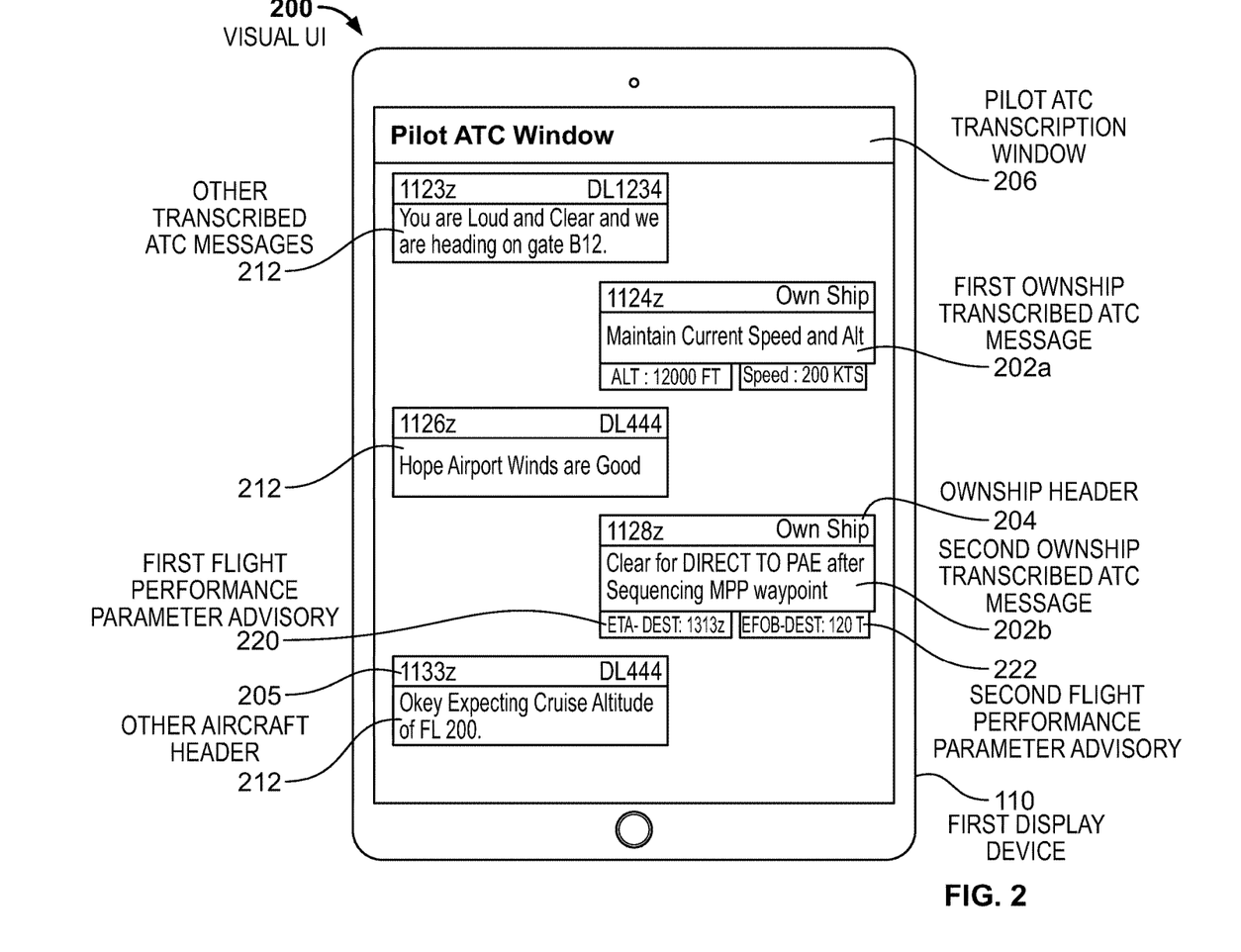
FIGS. 2 and 3 depict exemplary visual user interfaces, in accordance with exemplary embodiments.

Exemplary forms for the generated displays are described with reference to FIGS. 2 and 3. An exemplary visual user interface (visual UI) 200 is illustrated in FIG. 2. The visual UI 200 includes a pilot ATC transcription window 206 that displays messages between ATC 114 and a member of the flight crew. The pilot ATC transcription window 206 displays ownship transcribed ATC messages 202a, 202b, 202c and other transcribed ATC messages 212 (e.g. related to other aircraft but transcribed based on voice communications over the ATC voice channel). The ownship transcribed ATC messages 202a, 202b, 202c are visually differentiated from the other transcribed ATC messages 212 in some way. In the present example, ownship transcribed ATC messages 202a, 202b, 202c are placed in a right side column and the other transcribed ATC messages 212 are placed in a left side column but an opposite orientation could be used and other differentiating forms could additionally, or alternatively, be implemented such as color coding. The ownship transcribed ATC messages 202a, 202b, 202c include an ownship header 204 that includes an alphanumeric identifier of the ownship whereas the other transcribed ATC messages 212 include the other aircraft header 205 including an alphanumeric identifier of each other aircraft. Each transcribed ATC message 202a, 202b, 202c is provided in a respective message bubble or message box in the pilot ATC transcription window 206.

Each ownship transcribed ATC message 202a, 202b, 202c is analyzed by the analyzer 104 to extract flight plan information 130. The flight plan information may include a request received from, or a request submitted to, ATC 114 relating to speed, altitude or spatial direction for the ownship aircraft 10. Using rules and knowledge data 164 (e.g. aviation lexicon knowledge) from the rules and knowledge database 162, the analyzer 104 identifies key pieces of flight plan information 130. The request builder 106 formulates an API service request based on the flight plan information 130, which asks for flight performance parameters 158 that are impacted by the flight plan information 130 extracted from the ownship transcribed ATC messages 202a, 202b, 202c. The avionics service system 115 returns the requested flight performance parameters 158 for display on the visual UI 200. Referring to FIG. 2, a first flight performance parameter advisory 220 is tagged to the ownship transcribed ATC message 202a, 202b, 202c from which the flight performance parameters 158 have been derived. Further, a second, different, flight performance parameter advisory 222 is tagged to the ownship transcribed ATC message 202a, 202b, 202c from which the flight performance parameters 158 have been derived. Just one, or more than two, such flight performance parameter advisories 220, 222 may be pinned to the ownship transcribed ATC message 202a, 202b, 202c. The flight performance parameter advisories 220, 222 may be in the form of a text box tagged to an edge of a text box of the ownship transcribed ATC message 202a, 202b, 202c. The flight performance parameter advisories 220, 222 may include a color filling and/or a colored boundary that is different from that of the ownship transcribed ATC message 202a, 202b, 202c.

In a first exemplary use case, ATC 114 has instructed the ownship aircraft 10 to maintain current altitude and speed. The voice message from ATC 114 is converted to text by the voice to text transcription application 102 and displayed in the pilot ATC transcription window 206 as the first ownship transcribed ATC message 202a. The analyzer extracts the flight plan information 130 (maintain altitude and maintain speed) and the request builder 106 builds a service request for current altitude value and the current speed value. More particularly, the analyzer 104 recognizes the command word "MAINTAIN" and the type words "Speed" and "Altitude". In some embodiments, the request builder 106 decides upon which of a plurality of kinds of service request to select based upon identified command words. This service request decision can be made by accessing a look up table associating commands and service request types. The avionics service system 115 returns a current altitude value of 12,000 FT and a current speed of 200 KTS. These altitude and speed values are included in first and second flight performance parameter advisories 220, 222 and tagged to the associated first ownship transcribed ATC message 202a.

In a second use case example, ATC 114 instructs the ownship aircraft to clear to Direct to PAE after Sequencing Waypoint MPP. This instruction is transcribed by the voice to text transcription application 102 and displayed in the pilot ATC transcription window 206 as a second ownship transcribed ATC message 202b. The analyzer 104 extracts the flight plan information 130 including a flight plan modification. More particularly, the analyzer 104 recognizes the command words "DIRECT TO" and "Sequencing" and is also able to recognize the waypoint identifiers ("MPP" and "PAE"). The modification of the flight plan is embodied in the flight plan information 130 and can be analyzed against the active flight plan using a service request asking for changes in destination time or changes in fuel (e.g. the impact of the flight plan modification on these parameters). In the depicted embodiment, absolute fuel and time values are depicted, which is another form of service request that could be made. The Estimated Time of Arrival (ETA) and Estimate Fuel on Board (EFOB) provided by the avionics service system 115 as flight performance parameters 158 are encapsulated in first and second flight performance parameter advisories 220, 222 tagged to the associated second ownship transcribed ATC message 202b.

Figure 3:
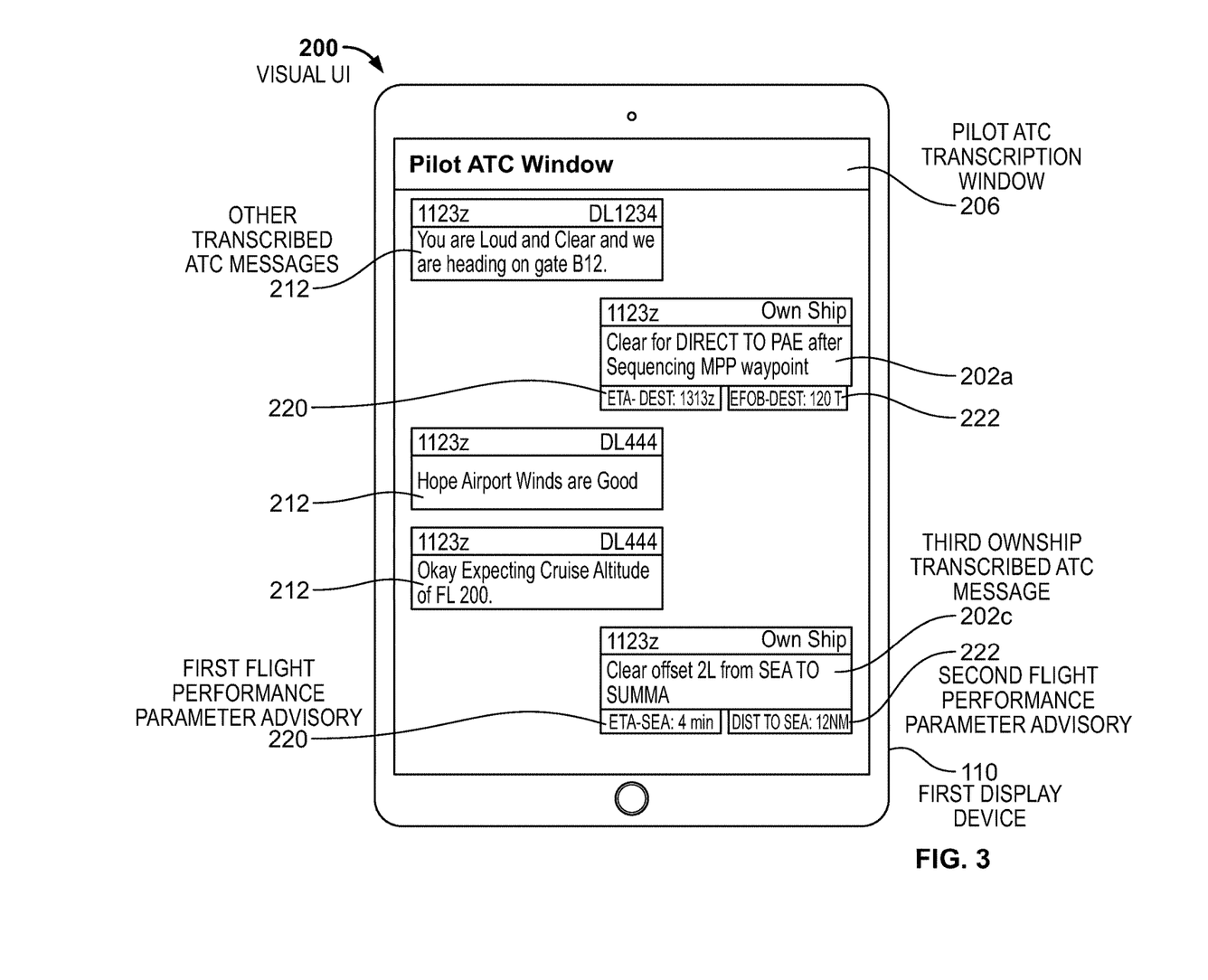

In another use case example shown in FIG. 3, a member of the flight crew has requested to ATC 114 for Offset change from a current flight path. The voice to text transcription application 102 provides a transcribed ATC broadcast message and the display generator 108 renders a corresponding third ownship transcribed ATC message 202c in the pilot ATC transcription window 206. The analyzer 104 and request builder 106 extracts flight plan information 130 and builds a service request based thereon in the form of request data 132. The analyzer 104 is able to identify the command "offset" and the waypoint identifiers "SEA" and "SUMMA" and the value "2L" as the flight plan information 130. In the present example, the service request is for an estimated time of arrival and distance to the waypoint SEA. The flight performance parameters 158 returned from the avionics service system 115 are embodied in first and second flight performance parameter advisories 220, 222 tagged to the associated third ownship transcribed ATC message 202c.

Figure 4:
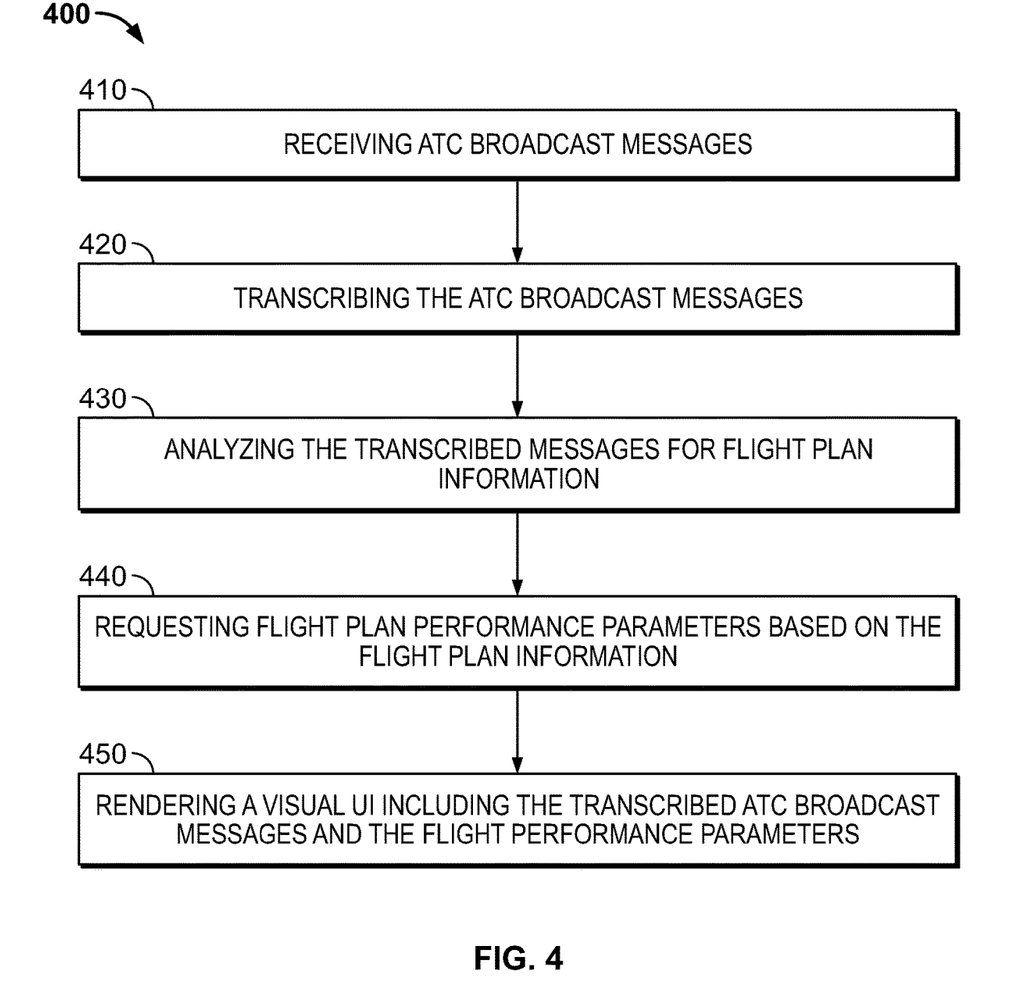
FIG. 4 is a flowchart of a method for transcribing and analyzing broadcast communications, in accordance with an embodiment.

A flow chart of an exemplary method 400 of analyzing ATC broadcast messages and generating associated flight performance parameters is provided in FIG. 4. The method 400 is computer implemented by the processing system 506 of FIG. 5, specifically by the various modules of the system 100 of FIG. 1 that are executed by the processing system 506 of FIG. 5.

The method 400 includes step 410 of receiving ATC broadcast messages 124, 125. The ATC broadcast messages 124,125 are received by the processing system 506 described with reference to FIG. 5 below. The ATC broadcast messages 124, 125 are provided to the voice to text transcription application 102 for machine implemented transcription in step 420.

In step 430, the transcribed ATC broadcast messages 154 are analyzed for flight plan information 130. The transcribed ATC broadcast messages 154 are sorted, by the analyzer 104, into those relevant to (addressing) the ownship aircraft 10 and those relevant to (addressing) other aircraft. The transcribed ATC broadcast messages 154 relevant to the ownship aircraft 10 are analyzed by, for example, machine learning natural language processing methods to extract flight plan information 130. The flight plan information 130 may be extracted to include a command and a subject of the command (e.g. a location). The command may include a change to a current flight plan being followed by the FMS 118.

In step 440, the request builder 106 may build a service request in the form of request data 132. The service request may include a service request for specified flight performance parameters 158 from a class of possible flight performance parameters 158. The flight performance parameters 158 may be selected based on the command included in the flight plan information 130. The request data 132 is built so as to conform to API definitions and service registry specifications retrieved from the API definition and service registry database 166. The request data 132 is sent to the avionics service system 115, which responds with the requested flight performance parameters 158. The avionics service system 115 may include a trajectory prediction function that utilizes flight plan information (e.g. a change of flight plan) included in the request data 132 to generate a predicted trajectory. The flight performance parameters 158 may be derived from the predicted trajectory.

In step 450, a visual UI 200 is rendered that depicts each transcribed ATC broadcast message 154 in a pilot ATC transcription window 206. The ownship transcribed ATC broadcast messages 202a, 202b, 202c are visually differentiated from the other transcribed ATC broadcast messages 212. The ownship transcribed ATC broadcast messages 202a, 202b are each analyzed for associated flight performance parameters 158 as described in steps 430 and 440. The flight performance parameters 158 are included in flight performance parameter advisories 220, 222 that are tagged to the associated ownship transcribed ATC messages 202a, 202b, 202c. In some embodiments, the ownship transcribed ATC messages 202a, 202b, 202c include a suggested or forthcoming change to a currently active flight plan. The second display device 112 may display the currently active flight plan and associated flight performance parameters and the first display device 110 displays the flight performance parameter advisories 220, 222 for the forthcoming, but not yet loaded, flight plan (i.e. the flight plan as modified).

Figure 5:
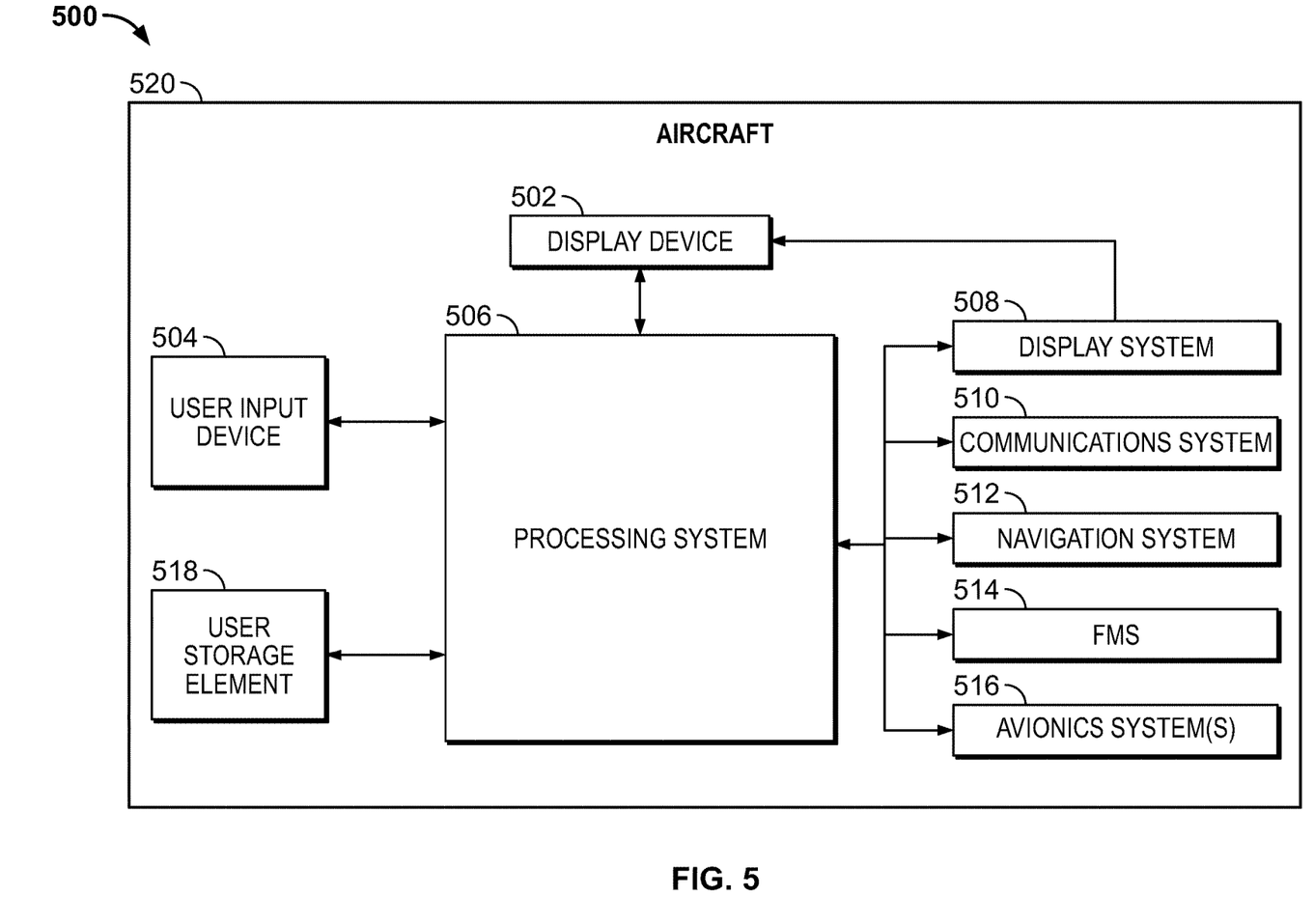
FIG. 5 depicts an exemplary embodiment of an aircraft system suitable for implementing the systems and methods for transcribing and analyzing broadcast communications, in accordance with one or more embodiments.

FIG. 5 depicts an exemplary embodiment of an aircraft system 500 suitable for implementing the descent below alerts described herein. The illustrated aircraft system 500 (corresponding to system 100 of FIG. 1) includes, without limitation, a display device 502 (corresponding to first display device 110 of FIG. 1), one or more user input devices 504, a processing system 506 (for implementing functions and methods described herein with respect to system 100), a communications system 510, a navigation system 512, a flight management system (FMS) 514 (corresponding to the FMS 118 of FIG. 1), one or more avionics systems 516, and a data storage element 518 (suitably configured to support operation of the system 500).

In exemplary embodiments, the display device 502 is realized as an electronic display capable of graphically displaying flight information or other data associated with operation of the aircraft 520 under control of the display system 508 and/or processing system 506. In this regard, the display device 502 is coupled to the display system 508 and the processing system 506, wherein the processing system 506 and the display system 508 are cooperatively configured to display, render, or otherwise convey one or more graphical representations or images associated with operation of the aircraft 520 on the display device 502. The user input device 504 is coupled to the processing system 506, and the user input device 504 and the processing system 506 are cooperatively configured to allow a user (e.g., a pilot, co-pilot, or crew member) to interact with the display device 502 and/or other elements of the system 500, as described herein. Depending on the embodiment, the user input device(s) 504 may be realized as a keypad, touchpad, keyboard, mouse, touch panel (or touchscreen), joystick, knob, line select key or another suitable device adapted to receive input from a user. In some embodiments, the user input device 504 includes or is realized as an audio input device, such as a microphone, audio transducer, audio sensor, or the like, that is adapted to allow a user to provide audio input to the system 500 in a "hands free" manner without requiring the user to move his or her hands, eyes and/or head to interact with the system 500.

The processing system 506 generally represents the hardware, software, and/or firmware components configured to facilitate communications and/or interaction between the elements of the aircraft system 500 and perform additional tasks and/or functions to support the system 100 of FIG. 1 during operation of the aircraft system 500, as described herein. Depending on the embodiment, the processing system 506 may be implemented or realized with a general-purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 506 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 506 includes processing logic that may be configured to carry out the functions, techniques, and processing tasks associated with the operation of the aircraft system 500, as described herein. Furthermore, the steps of a method or algorithm described in connection with the embodiments disclosed herein may be embodied directly in hardware, in firmware, in a software module executed by the processing system 506, or in any practical combination thereof. For example, in one or more embodiments, the processing system 506 includes or otherwise accesses a data storage element 518 (or memory), which may be realized as any sort of non-transitory short- or long-term storage media capable of storing programming instructions for execution by the processing system 506. The code or other computer-executable programming instructions, when read and executed by the processing system 506, cause the processing system 506 to support or otherwise perform certain tasks, operations, and/or functions described herein in the context of the flight rules alerts. Depending on the embodiment, the data storage element 518 may be physically realized using RAM memory, ROM memory, flash memory, registers, a hard disk, or another suitable data storage medium known in the art or any suitable combination thereof.

The display system 508 generally represents the hardware, software, and/or firmware components configured to control the display and/or rendering of one or more navigational maps and/or other displays pertaining to operation of the aircraft 520 and/or onboard systems 510, 512, 514, 516 on the display device 502. In this regard, the display system 508 may access or include one or more databases suitably configured to support operations of the display system 508, such as, for example, a terrain database, an obstacle database, a navigational database, a geopolitical database, a terminal airspace database, a special use airspace database, or other information for rendering and/or displaying navigational maps and/or other content on the display device 502.

Still referring to FIG. 5, in an exemplary embodiment, the processing system 506 is coupled to the navigation system 512, which is configured to provide real-time navigational data and/or information regarding operation of the aircraft 520. The navigation system 512 may be realized as a global navigation satellite system (e.g., a global positioning system (GPS), a ground-based augmentation system (GBAS), a satellite-based augmentation system (SBAS), and/or the like), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 512, as will be appreciated in the art. The navigation system 512 is capable of obtaining and/or determining the instantaneous position of the aircraft 520, that is, the current (or instantaneous) location of the aircraft 520 (e.g., the current latitude and longitude) and the current (or instantaneous) altitude or above ground level for the aircraft 520. The navigation system 512 is also capable of obtaining or otherwise determining the heading of the aircraft 520 (i.e., the direction the aircraft is traveling in relative to some reference). In the illustrated embodiment, the processing system 506 is also coupled to the communications system 510, which is configured to support communications to and/or from the aircraft 520. For example, the communications system 510 may support communications between the aircraft 520 and air traffic control or another suitable command center or ground location. In this regard, the communications system 510 may be realized using a radio communication system and/or another suitable data link system.

In an exemplary embodiment, the processing system 506 is also coupled to the FMS 514, which is coupled to the navigation system 512, the communications system 510, and one or more additional avionics systems 516 to support navigation, flight planning, and other aircraft control functions in a conventional manner, as well as to provide real-time data and/or information regarding the operational status of the aircraft 520 to the processing system 506. Although FIG. 5 depicts a single avionics system 516, in practice, the aircraft system 500 and/or aircraft 520 will likely include numerous avionics systems for obtaining and/or providing real-time flight-related information that may be displayed on the display device 502 or otherwise provided to a user (e.g., a pilot, a co-pilot, or crew member). For example, practical embodiments of the aircraft system 500 and/or aircraft 520 will likely include one or more of the following avionics systems suitably configured to support operation of the aircraft 520: a weather system, an air traffic management system, a radar system, a traffic avoidance system, an autopilot system, an autothrust system, a flight control system, hydraulics systems, pneumatics systems, environmental systems, aircraft systems, engine systems, trim systems, lighting systems, crew alerting systems, electronic checklist systems, an electronic flight bag and/or another suitable avionics system. In various embodiments, the processing system 506 may obtain information pertaining to the current location and/or altitude of the aircraft 520 and/or other operational information characterizing or otherwise describing the current operational context or status of the aircraft 520 from one or more of the onboard systems 508, 510, 512, 514, 516.

It should be understood that FIG. 5 is a simplified representation of the aircraft system 500 for purposes of explanation and ease of description, and FIG. 5 is not intended to limit the application or scope of the subject matter described herein in any way. It should be appreciated that although FIG. 10 shows the various elements of the system 500 being located onboard the aircraft 520 (e.g., in the cockpit), in practice, one or more of the elements of the system 500 may be located outside the aircraft 520 (e.g., on the ground as part of an air traffic control center or another command center) and communicatively coupled to the remaining elements of the aircraft system 500 (e.g., via a data link and/or communications system 510). For example, in some embodiments, the data storage element 518 may be located outside the aircraft 520 and communicatively coupled to the processing system 506 via a data link and/or communications system 510. Furthermore, practical embodiments of the aircraft system 500 and/or aircraft 520 will include numerous other devices and components for providing additional functions and features, as will be appreciated in the art. In this regard, it will be appreciated that although FIG. 5 shows a single display device 502, in practice, additional display devices may be present onboard the aircraft 520. Additionally, it should be noted that in other embodiments, features and/or functionality of processing system 506 described herein can be implemented by or otherwise integrated with the features and/or functionality provided by the FMS 514. In other words, some embodiments may integrate the processing system 506 with the FMS 514. In yet other embodiments, various aspects of the subject matter described herein may be implemented by or at an electronic flight bag (EFB) or similar electronic device that is communicatively coupled to the processing system 506 and/or the FMS 514.

For the sake of brevity, conventional techniques related to sensors, statistics, data analysis, avionics systems, redundancy, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method for providing a visual user interface on a display associated with an aircraft, the method comprising:
   receiving, via a receiving system of the aircraft, a first ownship Air Traffic Control (ATC) broadcast message;
   transcribing, using a voice to text application, the first ownship ATC broadcast message;
   analyzing, via at least one processor, the transcribed first ownship ATC broadcast message for flight plan information;
   sending a request, via the at least one processor, to an avionics service system to determine at least one flight performance parameter based on the flight plan information;
   receiving, via the at least one processor, the determined at least one flight performance parameter from the avionics service system in response to the request; and
   rendering, via the at least one processor, a visual User Interface (UI) including the transcribed first ownship ATC broadcast message and a flight performance parameter advisory based on the at least one flight performance parameter received from the avionics service system in response to the request, wherein the flight performance parameter advisory is tagged to the transcribed first ownship ATC broadcast message in the visual UI.

2. The method of claim 1, wherein the at least one flight performance parameter includes at least one of fuel remaining, time of arrival, and distance to destination.

3. The method of claim 1, wherein sending the request includes embodying the flight plan information in an Application Programming Interface (API) request.

4. The method of claim 1, comprising:
   receiving, via the receiving system of the aircraft, a plurality of ATC broadcast messages;
   sorting, via the at least one processor, the plurality of ATC broadcast messages into ownship ATC broadcast messages and other aircraft ATC broadcast messages, the ownship ATC broadcast messages including the first ownship ATC broadcast message; and
   rendering, via the at least one processor, the visual UI to include the ownship ATC broadcast messages and other aircraft ATC broadcast messages in a visually differentiated way.

5. The method of claim 1, wherein the visual UI is a pilot ATC transcription message window.

6. The method of claim 1, wherein the flight plan information includes a flight plan modification.

7. The method of claim 6, comprising rendering, via at least one processor, a second visual UI on a second display associated with the aircraft, the second visual UI depicting the at least one flight performance parameter for a current flight plan that has not yet been modified by the flight plan modification.

8. The method of claim 1, wherein the avionics service system is a Flight Management System (FMS) of the aircraft.

9. The method of claim 1, wherein the avionics service system is a cloud service.

10. The method of claim 1, wherein the avionics service system builds a flight trajectory using the flight plan information and derives the at least one flight performance parameter from the flight trajectory.

11. A system for providing a visual user interface on a display associated with an aircraft, the system comprising:
  a receiving system of the aircraft configured to receive a first ownship Air Traffic Control (ATC) broadcast message;
  a display device associated with the aircraft; and
  at least one processor in operable communication with the receiving system and the display device, the at least one processor configured to execute program instructions, wherein the program instructions are configured to cause the at least one processor to:
    transcribe, using a voice to text application, the first ownship ATC broadcast message;
    analyze the transcribed first ownship ATC broadcast message for flight plan information;
    send a request, via the at least one processor, to an avionics service system to determine at least one flight performance parameter based on the flight plan information;
    receive the determined at least one flight performance parameter from the avionics service system in response to the request; and
    render a visual User Interface (UI) including the transcribed first ownship ATC broadcast message and a flight performance parameter advisory based on the at least one flight performance parameter received from the avionics service system in response to the request, wherein the flight performance parameter advisory is tagged to the transcribed first ownship ATC broadcast message in the visual UI.

12. The system of claim 11, wherein the at least one flight performance parameter includes at least one of fuel remaining, time of arrival, and distance to destination.

13. The system of claim 11, wherein sending the request includes embodying the flight plan information in an Application Programming Interface (API) request.

14. The system of claim 11, wherein the program instructions are configured to cause the at least one processor to:
  receive, via the receiving system of the aircraft, a plurality of ATC broadcast messages;
  sort the plurality of ATC broadcast messages into ownship ATC broadcast messages and other aircraft ATC broadcast messages, the ownship ATC broadcast messages including the first ownship ATC broadcast message; and
  render the visual UI to include the ownship ATC broadcast messages and other aircraft ATC broadcast messages in a visually differentiated way.

15. The system of claim 11, wherein the visual UI is a pilot ATC transcription message window.

16. The system of claim 11, wherein the flight plan information includes a flight plan modification.

17. The system of claim 16, wherein the program instructions are configured to cause the at least one processor to: render a second visual UI on a second display associated with the aircraft, the second visual UI depicting the at least one flight performance parameter for a current flight plan that has not yet been modified by the flight plan modification.

18. The system of claim 11, wherein the avionics service system is a Flight Management System (FMS) of the aircraft or a cloud service.

* * * * *